United States Patent
Chen

(10) Patent No.: US 10,634,882 B2
(45) Date of Patent: Apr. 28, 2020

(54) WIDE ANGLE LENS, IMAGING DEVICE, AND UNMANNED AERIAL VEHICLE

(71) Applicant: SZ DJI TECHNOLOGY CO., LTD, Shenzhen (CN)

(72) Inventor: Yuan Chen, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/535,492

(22) Filed: Aug. 8, 2019

(65) Prior Publication Data

US 2019/0361206 A1   Nov. 28, 2019

Related U.S. Application Data

(63) Continuation of application No. PCT/CN2018/074334, filed on Jan. 26, 2018.

(51) Int. Cl.
*G02B 13/00* (2006.01)
*G02B 13/18* (2006.01)
(Continued)

(52) U.S. Cl.
CPC ........ *G02B 13/0095* (2013.01); *B64C 39/024* (2013.01); *B64D 47/08* (2013.01);
(Continued)

(58) Field of Classification Search
CPC ...... G02B 13/0095; G02B 9/64; G02B 13/18; B64C 39/024; B64D 47/08; G03B 15/006; H04N 5/2254
(Continued)

(56) References Cited

U.S. PATENT DOCUMENTS 5,485,314 A * 1/1996 Sato ..................... G02B 15/177
359/691
2006/0274433 A1* 12/2006 Kamo ............... G02B 13/0095
359/793
(Continued)

FOREIGN PATENT DOCUMENTS

CN       104423016 A      3/2015
CN       204855918 U     12/2015
(Continued)

OTHER PUBLICATIONS

International Search Report from the State Intellectual Property Office of the P.R. China for International Application No. PCT/CN2018/074334, dated Oct. 29, 2018 (5 pages).

*Primary Examiner* — James R Greece
(74) *Attorney, Agent, or Firm* — Finnegan, Henderson, Farabow, Garrett & Dunner, LLP

(57) ABSTRACT

A wide angle lens includes a first lens group and a second lens group. The first lens group includes a first lens having a negative refractive power, a second lens having a negative refractive power, and a third lens having a positive refractive power. The second lens group includes a fourth lens having a positive refractive power, a fifth lens having a positive refractive power, a sixth lens having a negative refractive power, and a seventh lens having a positive refractive power. The wide angle lens satisfies the following relationship: H2/G2R2<1.8, wherein H2 is a diameter of the image side surface of the first lens, and G2R2 is a curvature radius of the image side surface of the first lens.

20 Claims, 11 Drawing Sheets

(51) Int. Cl.
*B64C 39/02* (2006.01)
*B64D 47/08* (2006.01)
*G02B 9/64* (2006.01)
*G03B 15/00* (2006.01)
*H04N 5/225* (2006.01)

(52) U.S. Cl.
CPC .............. *G02B 9/64* (2013.01); *G02B 13/18* (2013.01); *G03B 15/006* (2013.01); *H04N 5/2254* (2013.01); *B64C 2201/027* (2013.01); *B64C 2201/123* (2013.01)

(58) Field of Classification Search
USPC ......................................................... 359/708
See application file for complete search history.

(56) References Cited

U.S. PATENT DOCUMENTS

| | | | | |
|---|---|---|---|---|
| 2016/0282585 A1* | 9/2016 | Shih | .................... | G02B 13/0045 |
| 2018/0172963 A1* | 6/2018 | Kim | .................... | G02B 13/0045 |
| 2018/0373003 A1* | 12/2018 | Liu | ........................ | G02B 13/18 |

FOREIGN PATENT DOCUMENTS

| | | | |
|---|---|---|---|
| CN | 105372789 | A | 3/2016 |
| CN | 105607234 | A | 5/2016 |
| CN | 106443990 | A | 2/2017 |
| CN | 106772941 | A | 5/2017 |

\* cited by examiner

WIDE ANGLE LENS, IMAGING DEVICE, AND UNMANNED AERIAL VEHICLE

CROSS-REFERENCE TO RELATED APPLICATION

This application is a continuation application of International Application No. PCT/CN2018/074334, filed on Jan. 26, 2018, the entire contents of which are incorporated herein by reference.

TECHNICAL FIELD

The present disclosure relates to the technical field of optical imaging and, more particularly, to a wide angle lens, an imaging device, and an unmanned aerial vehicle.

BACKGROUND

As the advancement of technology, people have higher and higher requirements on photography. Wide angle lenses have a wide field of view, a long depth of field, and can be used for casual photography and ordinary landscape photography. Therefore, wide angle lenses have gained an increasing popularity among consumers. However, in an environment with a strong light, the incident light may bring a large amount of stray light reflection, which results in a poor sharpness for the wide angle lenses. In addition, because a circumference and a center of an image side of an outer side lens both have issues with the uniformity of a coating, the wide angle lenses have a poor stability.

SUMMARY

According to an aspect of the present disclosure, a wide angle lens is provided. The wide angle lens includes a first lens group and a second lens group disposed in sequence from an object side to an image side of the wide angle lens. The first lens group includes, in sequence from an object side to an image side of the first lens group: a first lens having a negative refractive power. An object side surface of the first lens is a convex surface and an image side surface is a concave surface. The first lens group also includes a second lens having a negative refractive power. An object side surface of the second lens is a convex surface and an image side surface is a concave surface. The first lens group further includes a third lens having a positive refractive power. Both of an object side surface and an image side surface of the third lens are convex surfaces. The second lens group includes, in sequence from an object side to an image side of the second lens group: a fourth lens having a positive refractive power. An object side surface of the fourth lens is a flat surface and an image side surface is a convex surface. The second lens group also includes a fifth lens having a positive refractive power. Both of an object side surface and an image side surface of the fifth lens are convex surfaces. The second lens group also includes a sixth lens having a negative refractive power. Both of an object side surface and an image side surface are concave surfaces. The second lens group further includes a seventh lens having a positive refractive power. Both of an object side surface and an image side surface are convex surfaces. The wide angle lens satisfies the following relationship: H2/G2R2<1.8. H2 is a diameter of the image side surface of the first lens, and G2R2 is a curvature radius of the image side surface of the first lens.

According to another aspect of the present disclosure, an imaging device is provided. The imaging device includes an imaging sensor and a wide angle lens. The wide angle lens includes a first lens group and a second lens group disposed in sequence from an object side to an image side of the wide angle lens. The first lens group includes, in sequence from an object side to an image side of the first lens group: a first lens having a negative refractive power. An object side surface of the first lens is a convex surface and an image side surface is a concave surface. The first lens group also includes a second lens having a negative refractive power. An object side surface of the second lens is a convex surface and an image side surface is a concave surface. The first lens group further includes a third lens having a positive refractive power. Both of an object side surface and an image side surface of the third lens are convex surfaces. The second lens group includes, in sequence from an object side to an image side of the second lens group: a fourth lens having a positive refractive power. An object side surface of the fourth lens is a flat surface and an image side surface is a convex surface. The second lens group also includes a fifth lens having a positive refractive power. Both of an object side surface and an image side surface of the fifth lens are convex surfaces. The second lens group also includes a sixth lens having a negative refractive power. Both of an object side surface and an image side surface are concave surfaces. The second lens group further includes a seventh lens having a positive refractive power. Both of an object side surface and an image side surface are convex surfaces. The wide angle lens satisfies the following relationship: H2/G2R2<1.8. H2 is a diameter of the image side surface of the first lens, and G2R2 is a curvature radius of the image side surface of the first lens. The imaging sensor is provided at the image side of the wide angle lens.

According to a further aspect of the present disclosure, an unmanned aerial vehicle is provided. The unmanned aerial vehicle includes an imaging device and an aircraft body. The imaging device is mounted to the aircraft body. The imaging device includes an imaging sensor and a wide angle lens. The wide angle lens includes a first lens group and a second lens group disposed in sequence from an object side to an image side of the wide angle lens. The first lens group includes, in sequence from an object side to an image side of the first lens group: a first lens having a negative refractive power. An object side surface of the first lens is a convex surface and an image side surface is a concave surface. The first lens group also includes a second lens having a negative refractive power. An object side surface of the second lens is a convex surface and an image side surface is a concave surface. The first lens group further includes a third lens having a positive refractive power. Both of an object side surface and an image side surface of the third lens are convex surfaces. The second lens group includes, in sequence from an object side to an image side of the second lens group: a fourth lens having a positive refractive power. An object side surface of the fourth lens is a flat surface and an image side surface is a convex surface. The second lens group also includes a fifth lens having a positive refractive power. Both of an object side surface and an image side surface of the fifth lens are convex surfaces. The second lens group also includes a sixth lens having a negative refractive power. Both of an object side surface and an image side surface are concave surfaces. The second lens group further includes a seventh lens having a positive refractive power. Both of an object side surface and an image side surface are convex surfaces. The wide angle lens satisfies the following relationship: H2/G2R2<1.8. H2 is a diameter of the image side surface of the first lens, and G2R2 is a curvature radius of the image side surface of the first lens. The imaging sensor is provided at the image side of the wide angle lens.

The wide angle lens of the embodiments of the present disclosure may satisfy the above relationship, which helps reduce the stray light reflection brought by the incident light in an environment having a strong light, and increase the sharpness of the wide angle lens. The wide angle lens can also help address the uniformity issues of the coating on the image side surface of the first lens, thereby enhancing the reliability of the wide angle lens.

The imaging device of the embodiments of the present disclosure may include an imaging sensor and the wide angle lens disclosed herein, the imaging sensor may be disposed at the image side of the wide angle lens.

In the imaging device of the embodiments of the present disclosure, the wide angle lens may satisfy a relationship of H2/G2R2<1.8, which helps reduce the stray light reflection brought by the incident light in an environment having a strong light, and increase the sharpness of the wide angle lens. The wide angle lens can also help address the uniformity issues of the coating on the image side surface of the first lens, thereby enhancing the reliability of the wide angle lens.

The unmanned aerial vehicle of the embodiments of the present disclosure may include the imaging device disclosed herein and an aircraft body. The imaging device may be mounted on the aircraft body.

In the unmanned aerial vehicle of the embodiments of the present disclosure, the wide angle lens of the imaging device may satisfy the relationship of H2/G2R<1.8, which helps reduce the stray light reflection brought by the incident light in an environment having a strong light, and increase the sharpness of the wide angle lens. The wide angle lens can also help address the uniformity issues of the coating on the image side surface of the first lens, thereby enhancing the reliability of the wide angle lens.

Additional aspects and advantages of the present disclosure will be partially provided in the following descriptions, partially become evident in the following descriptions, or can be understood from practice of the present disclosure.

BRIEF DESCRIPTION OF THE DRAWINGS

The above and/or additional aspects and advantages of the present disclosure will become evident and easy to understand in the descriptions of the embodiments with reference to the following accompanying drawings, where.

DETAILED DESCRIPTION OF THE EMBODIMENTS

Figure 1:
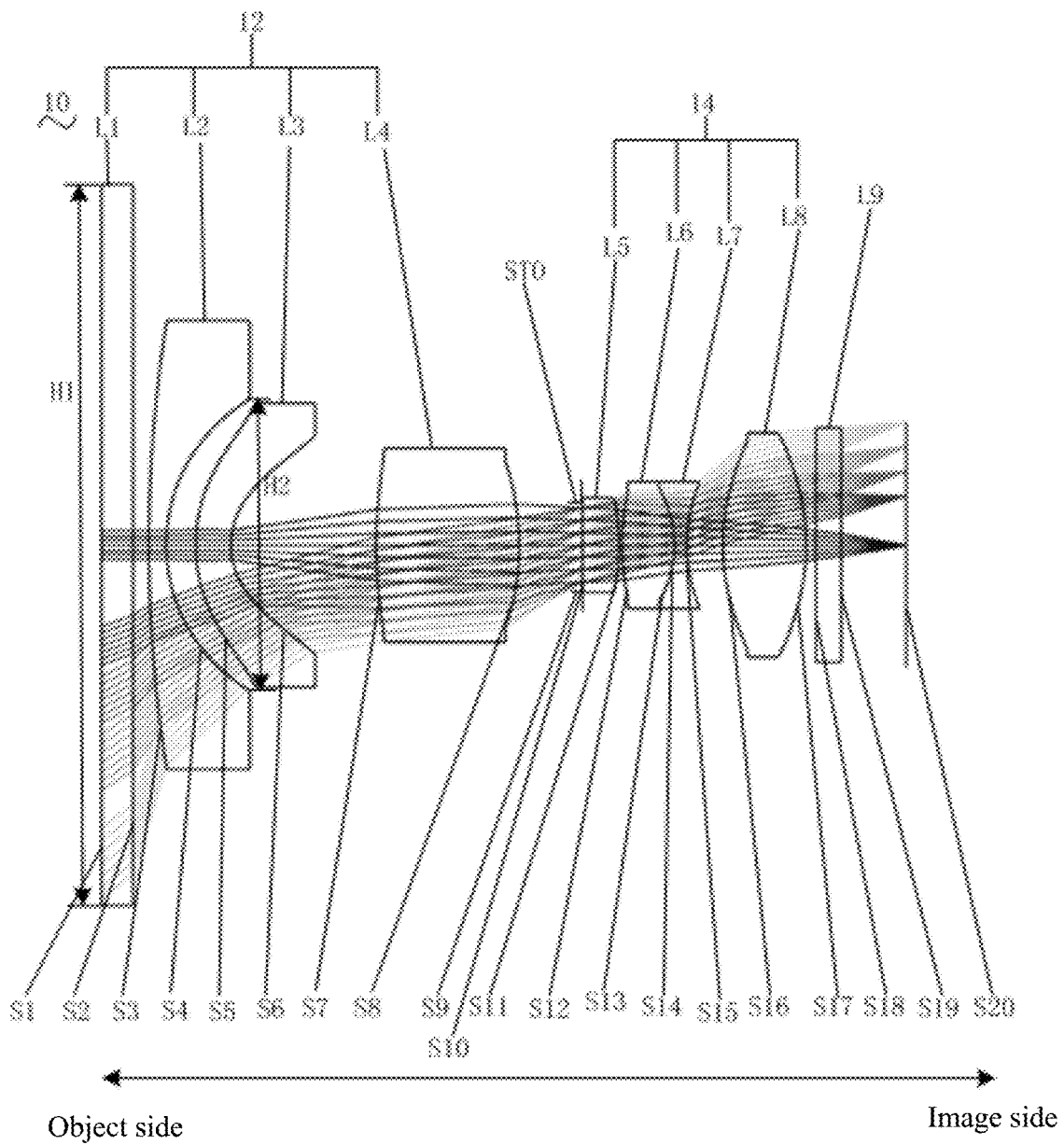
FIG. 1 is a schematic illustration of a structure of a wide angle lens, according to an embodiment of the present disclosure.
Figure 2:
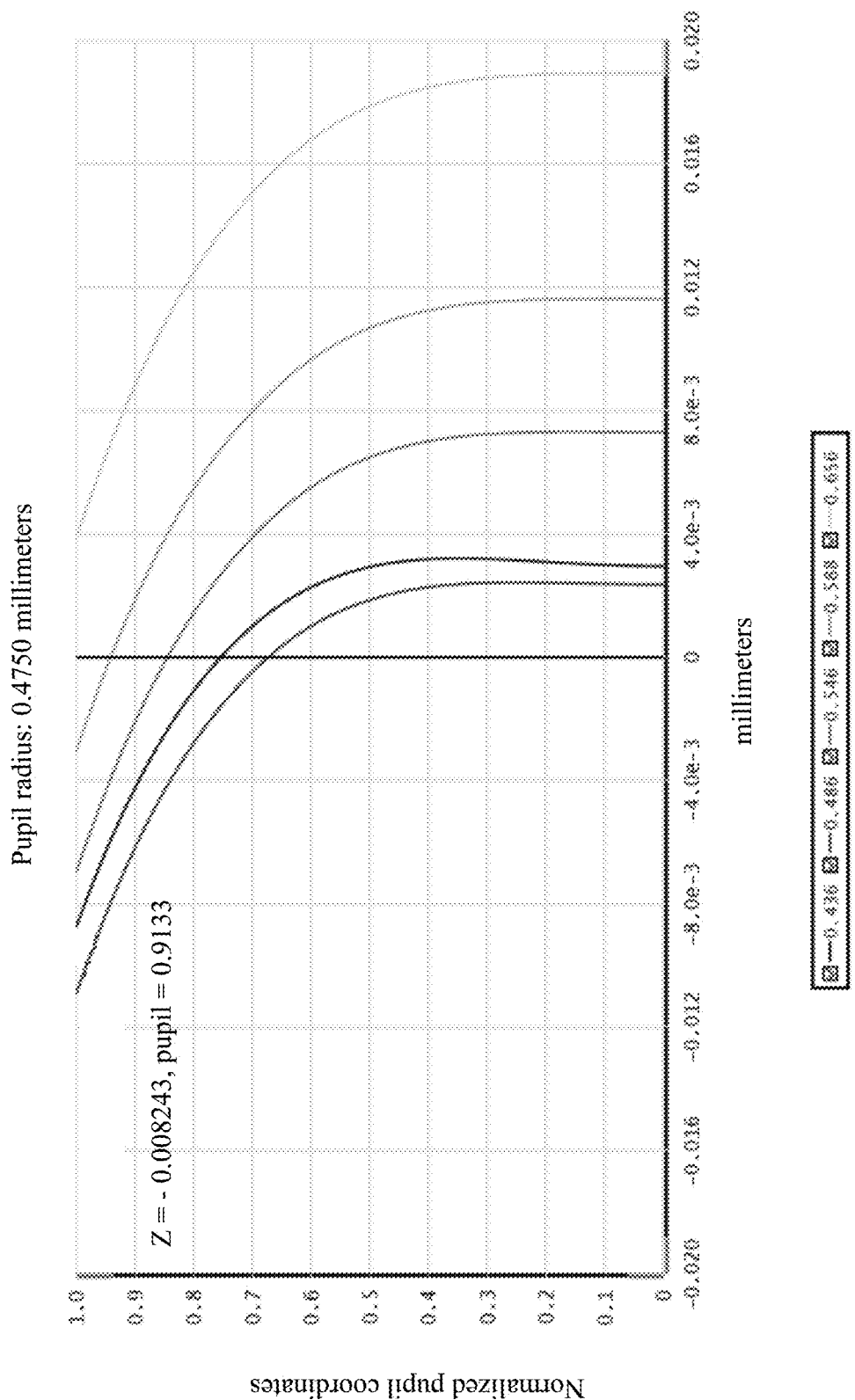
FIG. 2 is an axial aberration distribution plot of the wide angle lens, according to an embodiment of the present disclosure.
Figure 3:
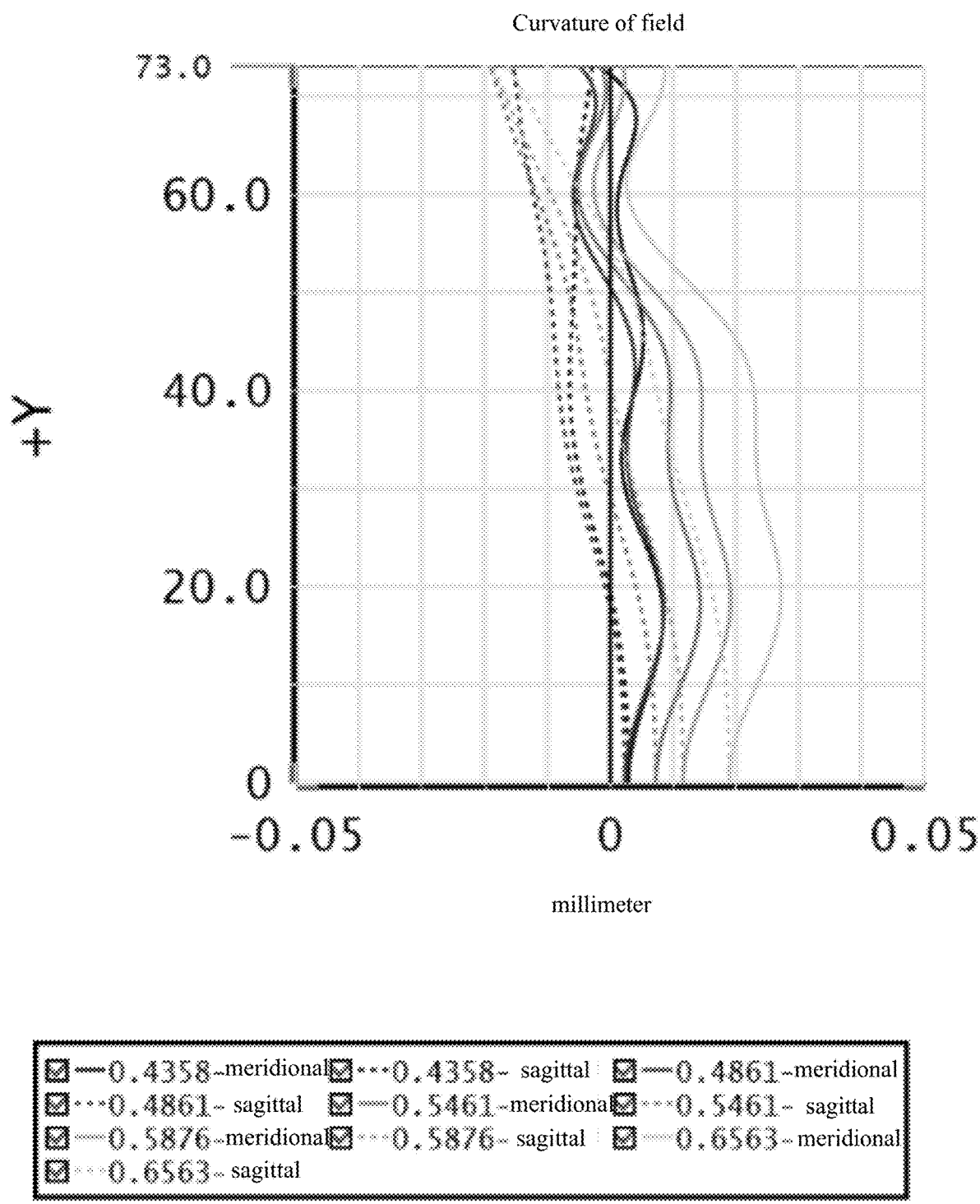
FIG. 3 is a curvature of field plot of the wide angle lens, according to an embodiment of the present disclosure.
Figure 4:
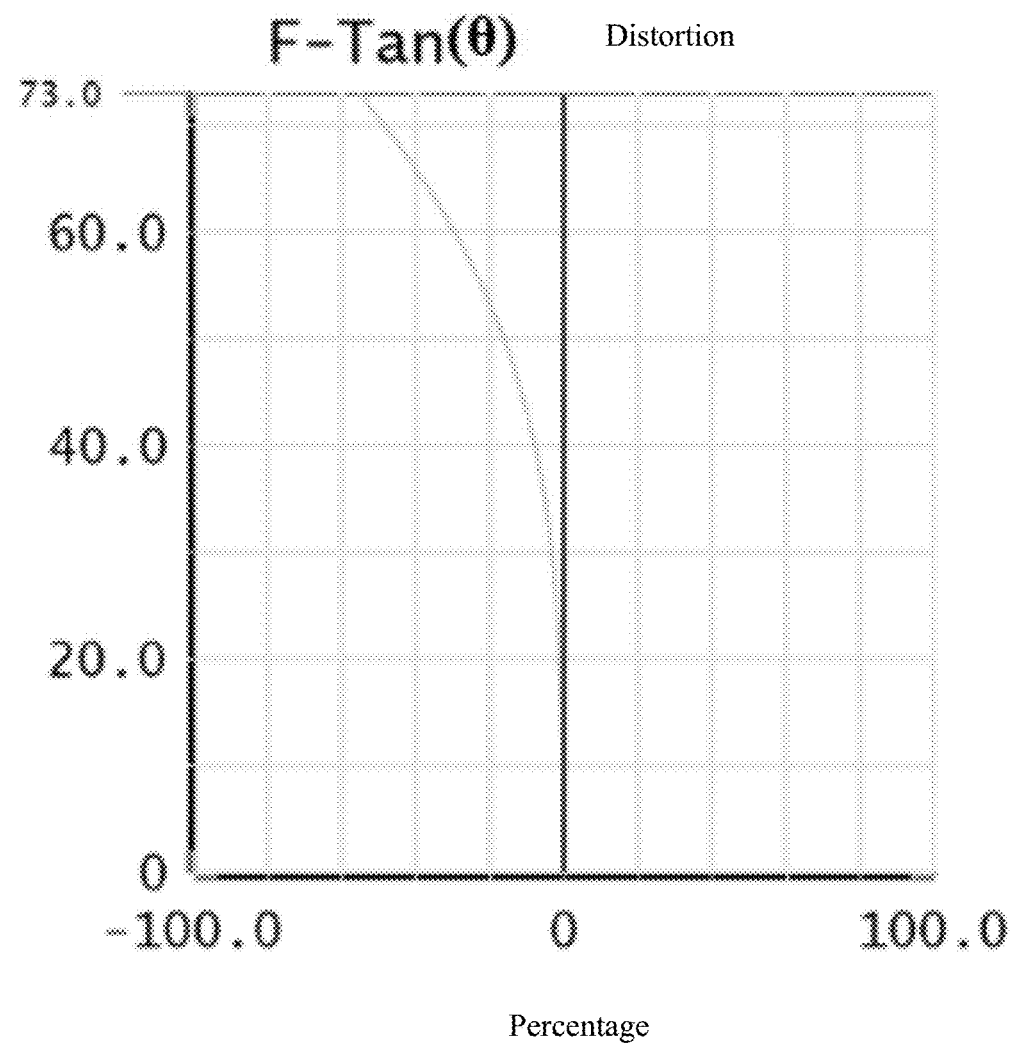
FIG. 4 is a distortion plot of the wide angle lens, according to an embodiment of the present disclosure.
Figure 5:
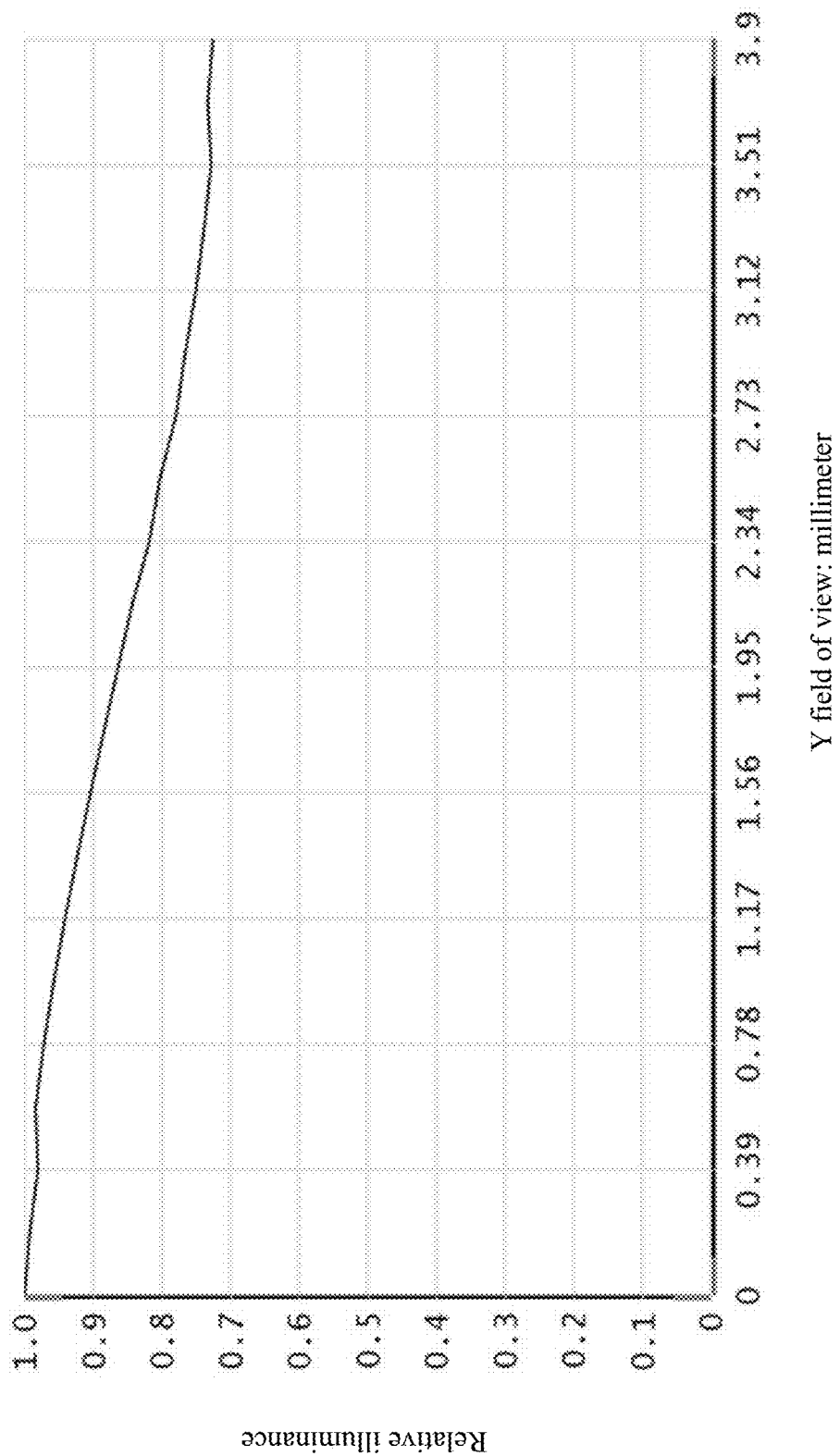
FIG. 5 is a relative illuminance distribution plot of the wide angle lens, according to an embodiment of the present disclosure.
Figure 6:
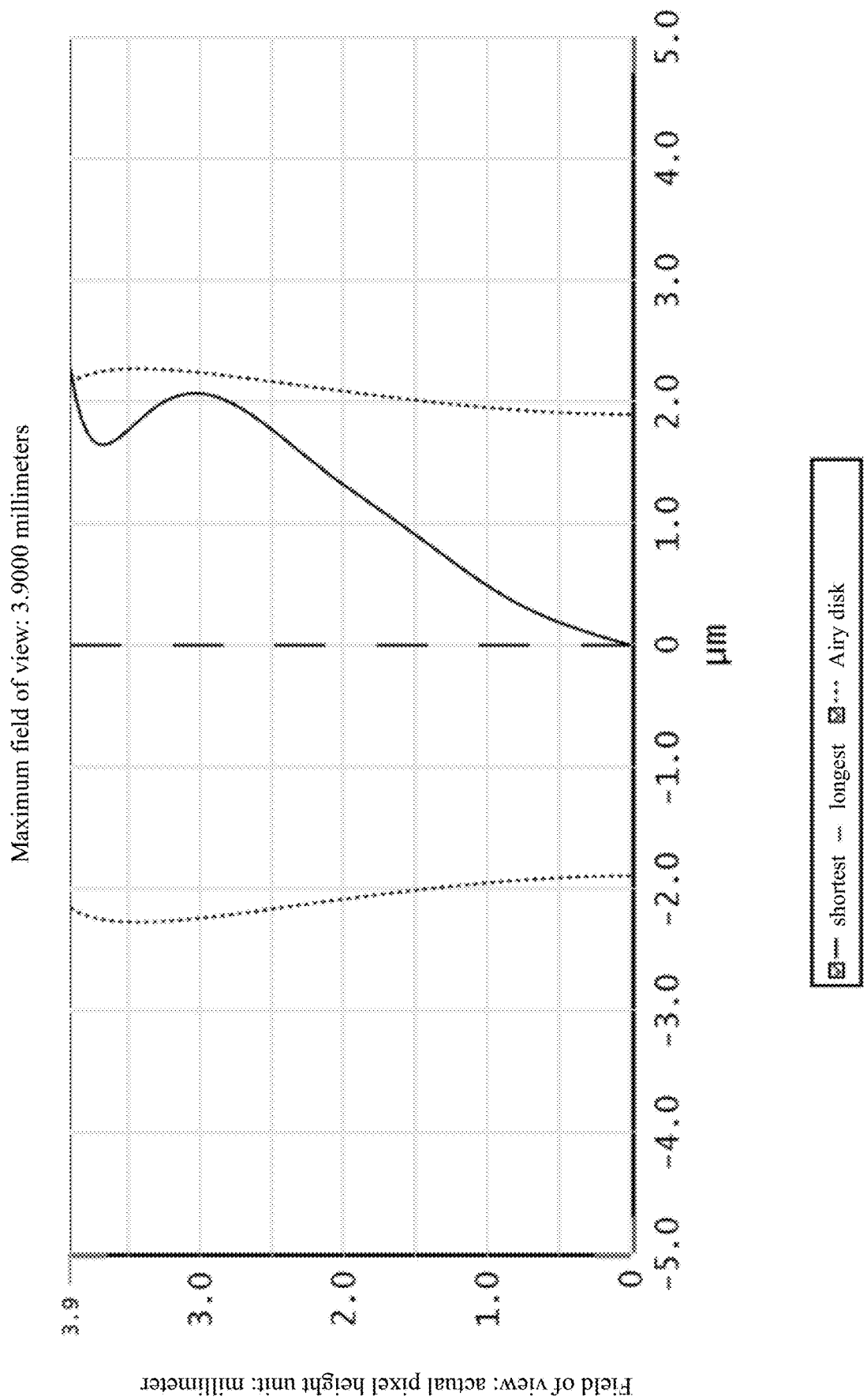
FIG. 6 is a transverse chromatic aberration distribution plot of the wide angle lens, according to an embodiment of the present disclosure.

Next, the embodiments of the present disclosure will be described in detail. Examples of the embodiments are shown in the accompanying drawings. The same or similar symbols that are used throughout the drawings indicate the same or similar components or components having the same or similar functions. The embodiments described below with reference to the accompanying drawings are illustrative, only used to explain the present disclosure, and cannot be understood as limiting the present disclosure.

In the descriptions of the present disclosure, it should be understood that, the orientation or positional relationship indicated by the terms such as "center," "longitudinal," "lateral," "length," "width," "thickness," "up," "down," "front," "rear," "left," "right," "vertical," "horizontal," "top," "bottom," "inside," "outside," "clockwise," "counter clockwise" are based on the orientation or positional relationship shown in the drawings, are only for the convenience of describing the present disclosure and simplifying the descriptions, and do not indicate or imply that the device or component have a specific orientation, or are configured or operated based on the specific orientation. Therefore, these terms cannot be understood as being limiting the present disclosure. In addition, terms such as "the first," "the second" are only used for description purposes, and cannot be understood as indicating or implying the relative importance or implicitly indicating the quantity of the referenced technical feature. As such, the feature modified by "the first," "the second" may indicate or implicitly include one or more such features. In the descriptions of the present disclosure, "multiple" means two or more than two, unless there is other express and specific definition.

In the descriptions of the present disclosure, it should be noted that, unless there is an express definition and limitation, the term "mount," "couple," "connect" should be interpreted broadly. For example, it may be a fixed connection, a detachable connection, or an integral connection. It may be a mechanical connection, or an electrical connection. It may be a direct connection, or an indirect connection through an intermediate medium. It may be an internal connection between two components or an interactive relationship between the two components. For a person having ordinary skills in the art, the detailed meaning of the above terms in the present disclosure can be understood based on the specific context.

Referring to FIG. 1, a wide angle lens 10 may include a first lens group 12 and a second lens group 14 disposed in sequence from the object side to the image side. The first lens group 12 may include in sequence from the object side to the image side:

a first lens L2 having a negative refractive power. An object side surface S3 of the first lens L2 may be a convex surface and an image side surface S4 may be a concave surface;

a second lens L3 having a negative refractive power. An object side surface S5 of the second lens L3 may be a convex surface and an image side surface S6 may be a concave surface;

a third lens L4 having a positive refractive power. An object side surface S7 and an image side surface S8 of the third lens L4 may both be convex surfaces;

The second lens group 14 may include in sequence from the object side to the image side:

a fourth lens L5 having a positive refractive power. An object side surface S10 of the fourth lens L5 may be a plat surface and an image side surface S11 may be a convex surface;

a fifth lens L6 having a positive refractive power. An object side surface S12 and an image side surface S13 of the fifth lens L6 may both be convex surfaces;

a sixth lens L7 having a negative refractive power. An object side surface S14 and an image side surface S15 of the sixth lens L7 may both be concave surfaces;

a seventh lens L8 having a positive refractive power. An object side surface S16 and an image side surface S17 of the seventh lens L8 may both be convex surfaces;

The wide angle lens 10 may satisfy the following relationship: H2/G2R2<1.8; where H2 is a diameter of the image side surface S4 of the first lens L2; and G2R2 is the curvature radius of the image side surface S4 of the first lens L2.

The wide angle lens 10 satisfying the above relationship can help reduce the stray light reflection brought by the incident light in an environment having a strong light, and increase the sharpness of the wide angle lens 10. In addition, the wide angle lens 10 can help address the uniformity issue of the coating on the image side surface S4 of the first lens L2, thereby improving the reliability of the wide angle lens 10.

In some embodiments, the wide angle lens 10 may include a diaphragm STO. The diaphragm STO may be disposed between the first lens group 12 and the second lens group 14. The diaphragm STO may be configured to adjust the strength of the light beam passing through the wide angle lens.

In some embodiments, the diaphragm STO may be attached to the object side surface S10 of the fourth lens L5.

In some embodiments, the object side surface S10 of the fourth lens L5 may be a flat surface, which makes it convenient to make the diaphragm STO as a blackout paper attached to the object side surface S10 of the fourth lens L5, thereby avoiding the ghost effect caused by the reflection of the diaphragm STO.

In some embodiments, the wide angle lens 10 may satisfy the following relationship: $0.02 > \Phi 1 + \Phi 2 > -0.02$; where $\Phi 1$ is the focal power of the first lens group 12; and $\Phi 2$ is the focal power of the second lens group.

In other words, $\Phi 1 + \Phi 2$ may be any value from the range of [−0.02, 0.02]. For example, the value may be −0.02, 0.02, or any value between −0.02 and 0.02.

The wide angle lens 10 that satisfies the above relationship can help reduce the shift of the focus of the wide angle lens 10 due to a high temperature or a low temperature.

In some embodiments, the first lens group 12 may include a protective lens L1 disposed on the object side of the first lens L2.

In some embodiments, the protective lens L1 may be wear resistant and scratch resistant, and may be used to protect the camera lens, such as to prevent dust from eroding the camera lens, thereby avoiding degrading the imaging quality. The protective lens L1 may be a glass lens. The lenses L2 to L8 may be plastic lenses. In the embodiment shown in FIG. 1, the wide angle lens 10 may also include a glass L9 used by the imaging sensor.

In some embodiments, the object side surface S1 and image side surface S2 of the protective lens L1 may both be flat surfaces. As such, effect of the protective lens L1 on the imaging of the wide angle lens 10 may be reduced.

In some embodiments, the wide angle lens 10 may satisfy the following relationship: H1<23 mm; where H1 is the diameter of the object side surface S1 of the protective lens L1. The wide angle lens 10 satisfying the above relationship may be advantageous for miniaturizing the appearance.

In some embodiments, the wide angle lens 10 may also include an optical filter. The optical filter may be disposed on the image side of the seventh lens L8. In the embodiment shown in FIG. 1, when the wide angle lens 10 is used for imaging, the light beam omitted or reflected by the photographed object OBJ may enter the wide angle lens 10 from the object side direction, and may pass in sequence the protective lens L1, the first lens L2, the second lens L3, the third lens L4, the fourth lens L5, the fifth lens L6, the seventh lens L8, and the optical filter, and finally converge on the imaging plane.

In some embodiments, the wide angle lens 10 may satisfy the following relationship: G2R1≥45 and 10≥G2R1/G2R2≥7; where G2R1 is the curvature radius of the object side surface S3 of the first lens L2; and G2R2 is the curvature radius of the object side surface S4 of the first lens L2.

In some embodiments, the value of G2R1 may be 45, 46, 50, 52, 55, 60, 70, or any other suitable value, and G2R1/G2R2 may be 7, 10, or any suitable value between 7 and 10.

The wide angle lens 10 satisfying the above relationship can help reduce the intensity of the ghost energy caused by reflection by the object side surface S3 of the first lens L2 and the protective lens L1 when the incident light enters at a large angle.

In some embodiments, the wide angle lens 10 may satisfy the following relationship: $y = 2 \times f \times \tan(\theta/2)$ and $f/2y \leq 0.35$; where, f is the focal length of the wide angle lens 10; $\theta$ is the incident angle of the wide angle lens 10; and y is the image height of the wide angle lens 10.

In some embodiments, the value of f/2y may be −0.66, −0.38, 0.12, 0.26, 0.35, or any other suitable value.

The wide angle lens 10 satisfying the above relationship can make the compression ratio of the object at the periphery of the stereo projection even smaller, and increase the ratio of the amount of information of the peripheral field of view. As such, when correcting the distortion of the image periphery, the loss of the pixels is relatively small, which is advantageous for improving the image quality.

In some embodiments, the wide angle lens 10 may satisfy the following relationship: 1.5≥G2R2/G3R1≥1.0; where, G2R2 is the curvature radius of the image side surface S4 of the first lens L2; and G3R1 is the curvature radius of the object side surface S5 of the second lens L3.

In other words, the value of G2R2/G3R1 may be 1.0, 1.5, or any suitable value between 1.0 and 1.5.

The wide angle lens 10 satisfying the above relationship can help reduce the intensity of the stray light in a backlight condition.

In some embodiments, the fifth lens L6 and the sixth lens L7 may be glued lenses.

In some embodiments, the object side surface S13 of the fifth lens L6 and the object side surface S14 of the sixth lens L7 may be glued together.

In some embodiments, the object side surface S5 and the image side surface S6 of the second lens L3 may both be aspheric surfaces, and the object side surface S7 and the image side surface S8 of the third lens L4 may both be aspheric surfaces.

As such, the disclosed configuration is advantageous for improving the off-axial aberration and reducing the stereo projection distortion.

In some embodiments, the object side surface S16 and the image side surface S17 of the seventh lens L8 may both be aspheric surfaces.

As such, the disclosed configuration is advantageous for improving the off-axial aberration and reducing the exit angle of the light beam, and for enabling the wide angle lens 10 to better fit with the imaging sensor.

A surface shape of the aspheric surface may be determined by the following equation:

$$x = \frac{ch^2}{1 + \sqrt{1 - (k+1)c^2h^2}} + \sum A_i h^i$$

Where, h is a height of any point on the aspheric surface to the optical axis, c is a vertex curvature, k is a conic constant, Ai is the i-th order correction factor of the aspheric surface.

Referring to FIG. 1 to FIG. 9, in the embodiments of the present disclosure, the wide angle lens 10 may satisfy the conditions in the following table:

TABLE 1

|  | Surface ID | R | D | N | V |
|---|---|---|---|---|---|
| OBJ |  | infinite | infinite |  |  |
|  | S1 | infinite | 1 | 1.5200 | 64.1 |
|  | S2 | infinite | 0.5 |  |  |
|  | S3 | 50 | 0.6 | 1.5000 | 81.6 |
|  | S4 | 5.45 | 0.6 |  |  |
|  | S5 | 4.2 | 0.86 | 1.8800 | 37.2 |
|  | S6 | 2.26 | 0.52 |  |  |
|  | S7 | 16.5 | 4.51 | 1.8100 | 40.7 |
|  | S8 | −8.18 | 2.01 |  |  |
| STO | S9 | infinite | 0 |  |  |
|  | S10 | infinite | 1.17 | 1.5900 | 68.6 |
|  | S11 | −6.98 | 0.1 |  |  |
|  | S12 | 7.66 | 1.68 | 1.5900 | 68.6 |
|  | S13 | −3.67 | 0.4 | 1.7000 | 30.1 |
| IMA | S14 | 5.1 | 1.11 |  |  |

TABLE 1-continued

| Surface ID | R | D | N | V |
|---|---|---|---|---|
| S15 | 6.76 | 2.7 | 1.5000 | 81.6 |
| S16 | −6.26 | 0.3 |  |  |
| S17 | infinite | 0.8 | 1.5200 | 64.1 |
| S18 | infinite | 1.94 |  |  |
| S19 | infinite | −0.0056 |  |  |
| S20 | infinite |  |  |  |

Where, R is the curvature radius, D is the axial distance, N is the refractive index, V is the Abbe number. S9 is the surface of the diaphragm STO, S18 and S19 are the surfaces of the glass used in the imaging sensor, and S20 is the imaging plane.

TABLE 2

| Lens | Focal length (mm) | Diopter |
|---|---|---|
| First lens | −10.30 | −0.0971 |
| Second lens | −6.96 | −0.1437 |
| Third lens | 7.35 | 0.1361 |
| Fourth lens | 14.00 | 0.0714 |
| Fifth lens | 12.88 | 0.0776 |
| Sixth lens | −5.90 | −0.1695 |
| Seventh lens | 7.00 | 0.1419 |

TABLE 3

| ID | K | A2 | A4 | A6 | A8 | A10 | A12 | A14 | A16 |
|---|---|---|---|---|---|---|---|---|---|
| S5 | −0.55 | 0.0000E+00 | 2.0000E−03 | −2.0000E−04 | 2.3700E−06 | −1.3800E−08 | 0.0000E+00 | 0.0000E+00 | 0.0000E+00 |
| S6 | −0.932 | 0.0000E+00 | 6.0000E−03 | −2.5000E−03 | −2.4600E−05 | 8.4700E−07 | 0.0000E+00 | 0.0000E+00 | 0.0000E+00 |
| S7 | −51.35 | 0.0000E+00 | 6.7000E−04 | −1.0700E−04 | 5.3100E−06 | −2.8100E−07 | 0.0000E+00 | 0.0000E+00 | 0.0000E+00 |
| S8 | −2.1 | 0.0000E+00 | −4.0000E−04 | −7.7000E−06 | −1.3000E−06 | 6.0200E−08 | 0.0000E+00 | 0.0000E+00 | 0.0000E+00 |
| S16 | −1.9 | 0.0000E+00 | 1.1000E−04 | 1.3800E−05 | −2.0600E−06 | −3.2400E−08 | 0.0000E+00 | 0.0000E+00 | 0.0000E+00 |
| S17 | −8.5 | 0.0000E+00 | −1.0000E−03 | 3.2300E−05 | −3.8900E−06 | −9.4800E−08 | 0.0000E+00 | 0.0000E+00 | 0.0000E+00 |

TABLE 4

| Temperature change | EFFL (mm) | H (°) | V (°) | D (°) |
|---|---|---|---|---|
| Normal temperature 25° C. | 2.6500 | 114.28 | 101.28 | 145.00 |
| Low temperature −40° C. | 2.6470 | 114.40 | 101.38 | 145.30 |
| High temperature 85° C. | 2.6540 | 114.20 | 101.16 | 144.80 |

Where, EFFL is the effective focal length of the wide angle lens 10, H is the horizontal angle of view, V is the vertical angle of view, and D is the diagonal angle of view.

Figure 7:
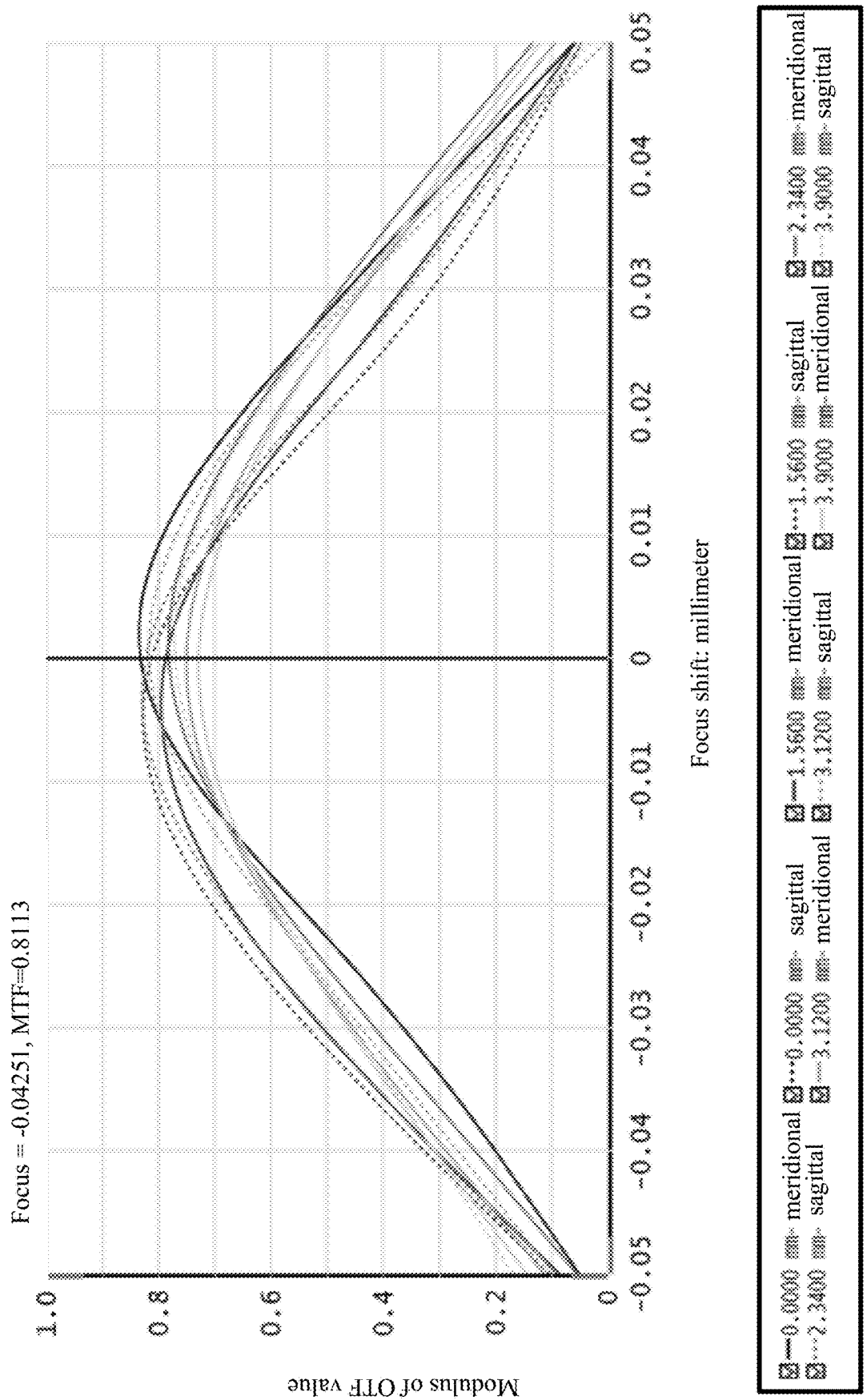
FIG. 7 is a defocus Modulation Transfer Function ("MTF") performance plot of the wide angle lens at a temperature of 25° C., according to an embodiment of the present disclosure.
Figure 8:
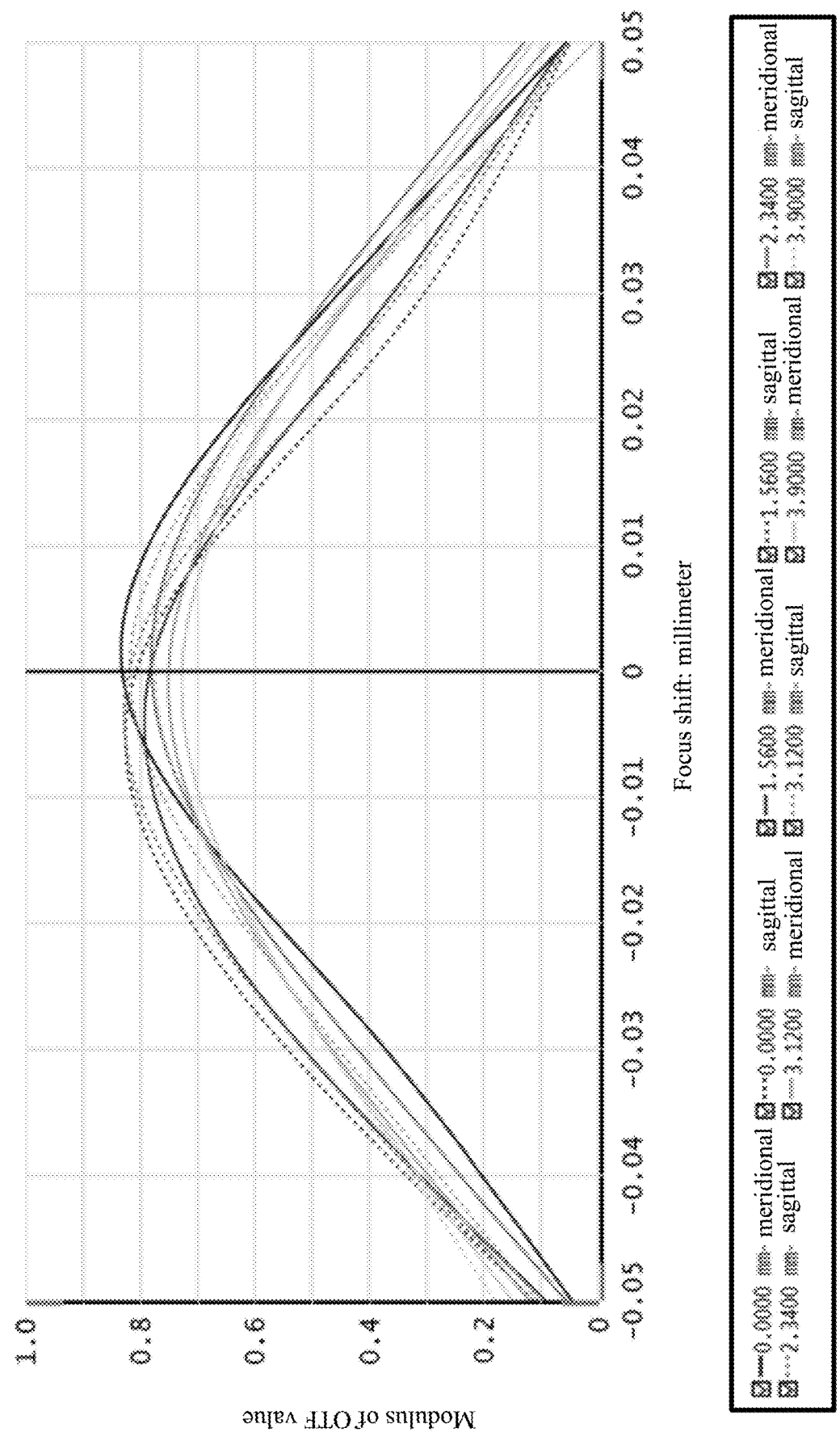
FIG. 8 is a defocus MTF performance plot of the wide angle lens at a temperature of −40° C., according to an embodiment of the present disclosure.
Figure 9:
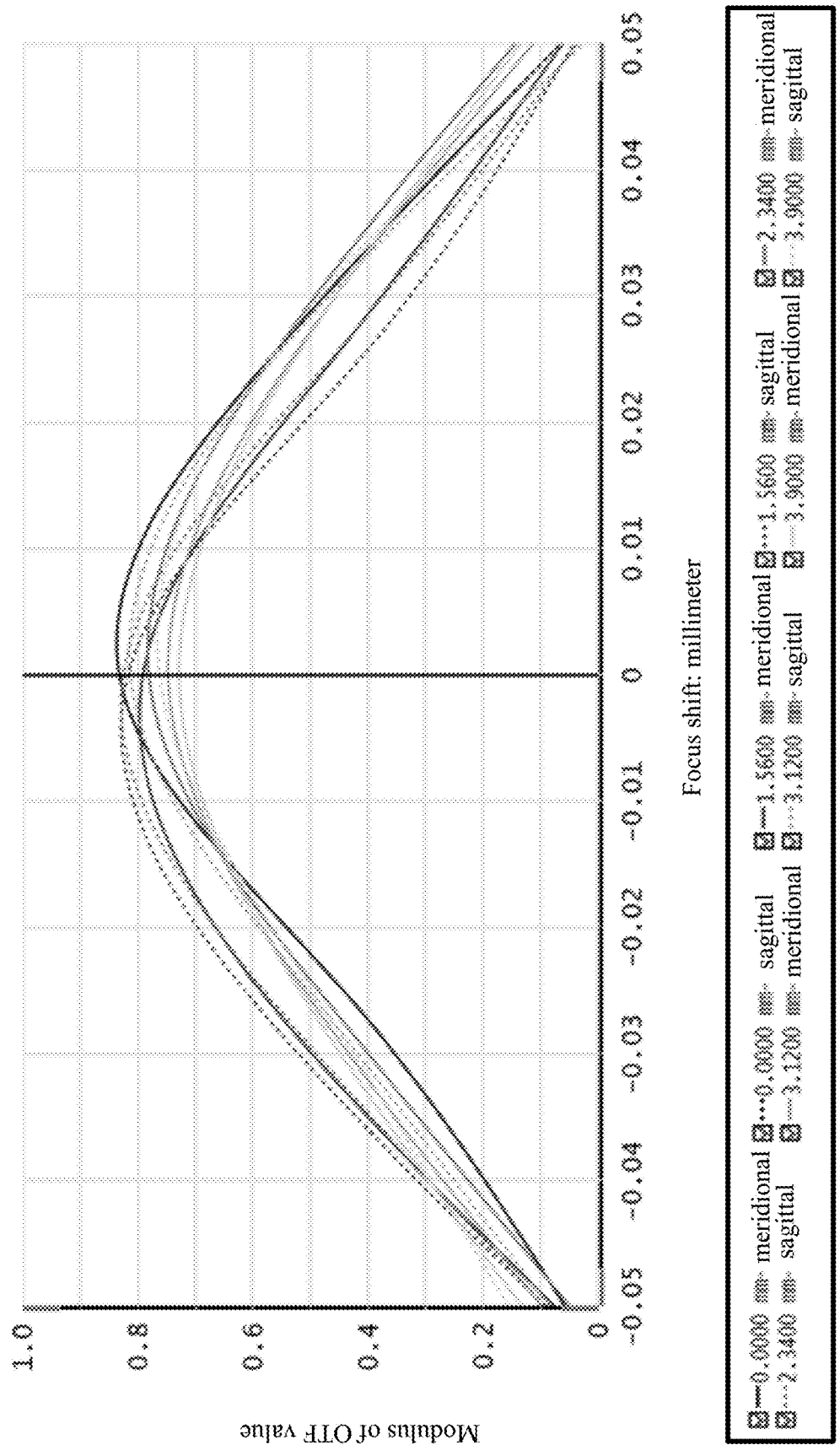
FIG. 9 is a defocus MTF performance plot of the wide angle lens at a temperature of 85° C., according to an embodiment of the present disclosure.

Referring to FIG. 7 to FIG. 9, which show the shift value of the lens focus of the wide angle lens in high and low temperature conditions according to embodiments of the present disclosure.

FIG. 7 shows the rear focal displacement performance of the wide angle lens 10 when the temperature is 25° C. FIG. 8 shows that at temperature −40° C., the amount of change of the rear focal displacement of the wide angle lens 10 is 0.005 millimeter (mm). FIG. 9 shows that at temperature 85° C., the amount of change of the rear focal displacement of the wide angle lens 10 is −0.005 mm. In FIG. 7 to FIG. 9, the horizontal coordinate is the focus shift in millimeters, and the vertical coordinate is the modulus of the optical transfer function ("OTF").

FIG. 7 to FIG. 9 show that the image quality of the wide angle lens 10 of the present disclosure under the high and low temperatures is relatively excellent.

Figure 10:
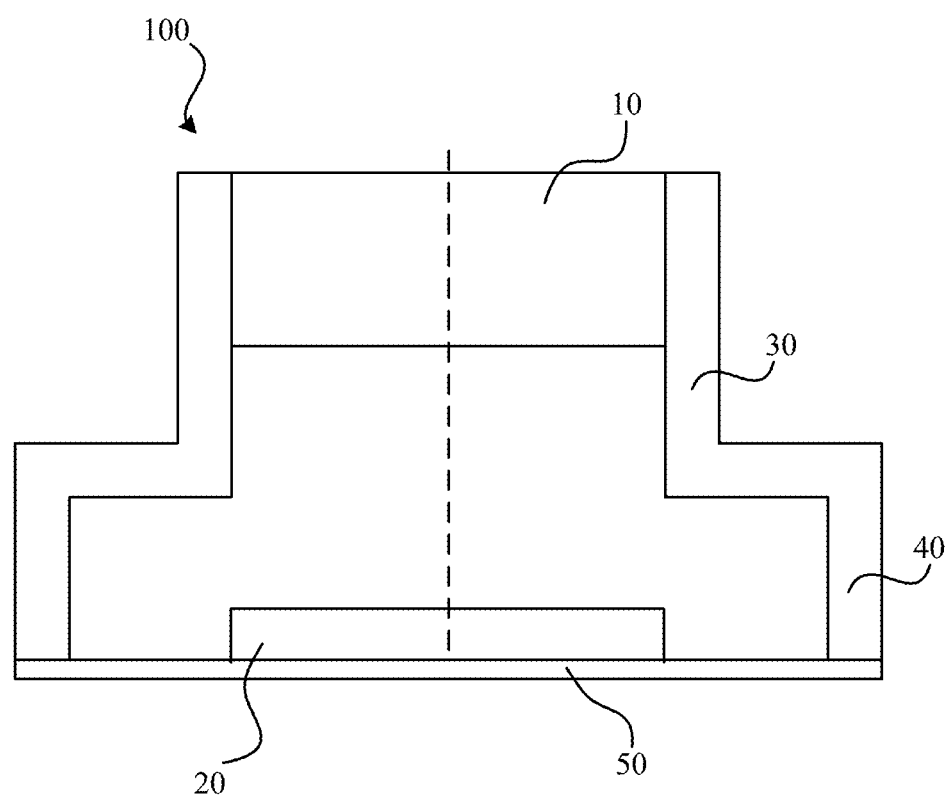
FIG. 10 is a schematic illustration of a structure of an imaging device, according to an embodiment of the present disclosure.

Referring to FIG. 10, an imaging device 100 of the present disclosure may include an imaging sensor 20 and the wide angle lens 10 disclosed herein. The imaging sensor 20 may be disposed at the image side of the wide angle lens 10.

In the imaging device 100 of the present disclosure, the wide angle lens 10 may satisfy the relationship of H2/G2R2<1.8, which can help reduce the stray light reflection brought by the incident light in an environment having a strong light, and increase the sharpness of the wide angle lens 10. The disclosed wide angle lens 10 can help address the uniformity issue of the coating on the image side surface S4 of the first lens L2, thereby improving the reliability of the wide angle lens 10.

In the embodiment shown in FIG. 10, the imaging device 100 may also include a lens tube 30, a lens holder 40, and a circuit board 50. The imaging sensor 20 may be disposed at the circuit board 50 and may be electrically connected with the circuit board 50. The lens holder 40 may be disposed on the circuit board 50. The lens tube 30 may be connected with the lens holder 40, and the wide angle lens 10 may be disposed in the lens tube 30.

Figure 11:
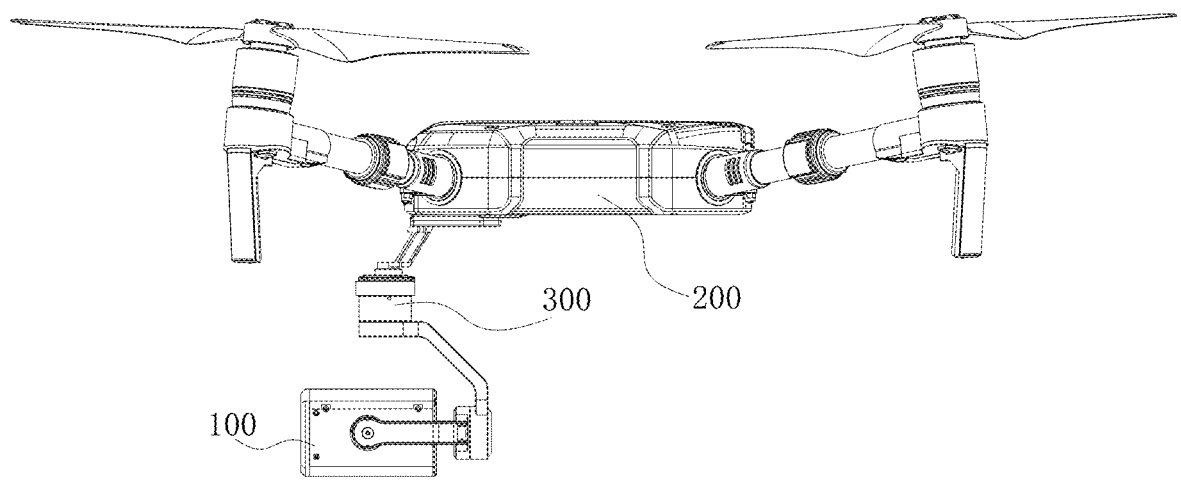
FIG. 11 is a schematic illustration of a structure of an unmanned aerial vehicle, according to an embodiment of the present disclosure.

Referring to FIG. 11, an unmanned aerial vehicle 1000 of the present disclosure may include the imaging device 100 disclosed herein and an aircraft body 200. The imaging device 100 may be mounted on the aircraft body 200.

In the unmanned aerial vehicle 1000 of the present disclosure, the wide angle lens 10 of the imaging device may satisfy the relationship of H2/G2R2<1.8, which can help reduce the stray light reflection brought by the incident light in an environment having a strong light, and increase the sharpness of the wide angle lens 10. The disclosed wide angle lens 10 can also help address the uniformity issue of the coating on the image side surface S4 of the first lens L2, thereby improving the reliability of the wide angle lens 10.

In some embodiments, the unmanned aerial vehicle 1000 may include a gimbal 300 mounted to the aircraft body 200. The imaging device 100 may be mounted to the gimbal 300.

In some embodiments, the gimbal 300 may be a three-axis stability enhancing gimbal. The imaging device may be mounted to the gimbal 300 to ensure that in the flight of the unmanned aerial vehicle 1000, the imaging device 100 can capture more stable images.

In the present disclosure, unless there is other express definition and limitation, when a first feature is described as located "above" or "below" the second feature, it may include the first and second features directly contacting each other. It may also include the first and second features not in direct contact, but in contact through a feature other than the first and the second features. In addition, when the first feature is described as located "above," "over," and "on" the second feature, it may include the first feature being located right above the second feature and in an oblique upper direction relative to the second feature, or it may only indicate that the horizontal height of the first feature is higher than that of the second feature. When the first feature is described as located "below," "under," or "beneath" the second feature, it may include the first feature being located right below the second feature and in an oblique lower direction relative to the second feature, or may only indicate that the horizontal height of the first feature is lower than that of the second feature.

The present disclosure provides different structures of various different embodiments or examples that are used to implement the present disclosure. To simplify the present disclosure, in the above texts, the components and configurations of specific examples are described. They are only illustrations, and the purpose is not to limit the present disclosure. In addition, the prevent disclosure may use repeated reference numbers and/or reference numerals in different examples. Such repetition is for the purpose of simplification and clarity, which does not indicate a relationship between the discussed various embodiments and/or configurations. Furthermore, the prevent disclosure provides examples of various specific processes and materials. A person having ordinary skills in the art can recognize applications of other processes and/or the use of other materials.

In the descriptions of the present disclosure, description of reference terms "an embodiment," "some embodiments," illustrative embodiment," "example," specific example," or "some examples" means the detailed feature, structure, material, or characteristic described with reference to the embodiment or example are included in at least one embodiment or example of the present disclosure. In the present specification, schematic expression of the above terms does not necessarily mean the same embodiment or example. Furthermore, the described detailed feature, structure, material, or characteristic may be combined in a suitable manner in any one or multiple embodiments or examples.

Although embodiments of the present disclosure have been illustrated and described, a person having ordinary skills in the art can appreciate: these embodiments can have various changes, modifications, substitutions, and variations without departing from the principles and purpose of the present disclosure. The scope of the present disclosure is defined by the claims and their equivalents.

What is claimed is:

1. A wide angle lens, comprising:
a first lens group and a second lens group disposed in sequence from an object side to an image side of the wide angle lens,
wherein the first lens group comprises, in sequence from an object side to an image side of the first lens group:
a first lens having a negative refractive power, wherein an object side surface of the first lens is a convex surface and an image side surface is a concave surface;
a second lens having a negative refractive power, wherein an object side surface of the second lens is a convex surface and an image side surface is a concave surface; and
a third lens having a positive refractive power, wherein both of an object side surface and an image side surface of the third lens are convex surfaces;
wherein the second lens group comprises, in sequence from an object side to an image side of the second lens group:
a fourth lens having a positive refractive power, wherein an object side surface of the fourth lens is a flat surface and an image side surface is a convex surface;
a fifth lens having a positive refractive power, wherein both of an object side surface and an image side surface of the fifth lens are convex surfaces;
a sixth lens having a negative refractive power, wherein both of an object side surface and an image side surface are concave surfaces; and
a seventh lens having a positive refractive power, wherein both of an object side surface and an image side surface are convex surfaces, and wherein the wide angle lens satisfies the following relationship:

H2/G2R2<1.8, wherein H2 is a diameter of the image side surface of the first lens, and G2R2 is a curvature radius of the image side surface of the first lens.

2. The wide angle lens according to claim 1, further comprising:
a diaphragm disposed between the first lens group and the second lens group.

3. The wide angle lens according to claim 2, wherein the diaphragm is attached to the object side surface of the fourth lens.

4. The wide angle lens according to claim 1, wherein the wide angle lens satisfies the following relationship:
0.02≥Φ1+Φ2≥−0.02, wherein Φ1 is a focal power of the first lens group, and Φ2 is a focal power of the second lens group.

5. The wide angle lens according to claim 1, wherein the first lens group includes:
a protective lens disposed at an object side of the first lens.

6. The wide angle lens according to claim 5, wherein both of an object side surface and an image side surface of the protective lens are flat surfaces.

7. The wide angle lens according to claim 6, wherein the wide angle lens satisfies the following relationship:
H1<23 mm, wherein H1 is a diameter of the object side surface of the protective lens.

8. The wide angle lens according to claim 5, wherein the wide angle lens satisfies the following relationship:
G2R1≥45 and 10≥G2R1/G2R2≥7, wherein G2R1 is a curvature radius of the object side surface of the first lens, and G2R2 is a curvature radius of the image side surface of the first lens.

9. The wide angle lens according to claim 1, wherein the wide angle lens satisfies the following relationship:
y=2×f×tan(θ/2) and f/2y≤0.35, wherein f is a focal length of the wide angle lens, θ is an incident angle of the wide angle lens, and y is an image height of the wide angle lens.

10. The wide angle lens according to claim 1, wherein the wide angle lens satisfies the following relationship:
1.5≥G2R2/G3R1≥1.0, wherein G2R2 is a curvature radius of the image side surface of the first lens, and G3R1 is a curvature radius of the object side surface of the second lens.

11. The wide angle lens according to claim 1, wherein the fifth lens and the sixth lens are both glued lenses.

12. The wide angle lens according to claim 1, wherein the object side surfaces and the image side surfaces of the second lens and the third lens are aspheric surfaces.

13. The wide angle lens according to claim 1, wherein both of the object side surface and the image side surface of the seventh lens are aspheric surfaces.

14. An imaging device, comprising:
an imaging sensor; and
a wide angle lens comprising:
a first lens group and a second lens group disposed in sequence from an object side to an image side of the wide angle lens,
wherein the first lens group comprises, in sequence from an object side to an image side of the first lens group:
a first lens having a negative refractive power, wherein an object side surface of the first lens is a convex surface and an image side surface is a concave surface;
a second lens having a negative refractive power, wherein an object side surface of the second lens is a convex surface and an image side surface is a concave surface; and
a third lens having a positive refractive power, wherein both of an object side surface and an image side surface of the third lens are convex surfaces;
wherein the second lens group comprises, in sequence from an object side to an image side of the second lens group:
a fourth lens having a positive refractive power, wherein an object side surface of the fourth lens is a flat surface and an image side surface is a convex surface;
a fifth lens having a positive refractive power, wherein both of an object side surface and an image side surface of the fifth lens are convex surfaces;
a sixth lens having a negative refractive power, wherein both of an object side surface and an image side surface are concave surfaces; and
a seventh lens having a positive refractive power, wherein both of an object side surface and an image side surface are convex surfaces,
wherein the wide angle lens satisfies the following relationship:
H2/G2R2<1.8, wherein H2 is a diameter of the image side surface of the first lens, and G2R2 is a curvature radius of the image side surface of the first lens, and
wherein the imaging sensor is provided at the image side of the wide angle lens.

15. The imaging device according to claim 14, wherein the wide angle lens further includes:
a diaphragm disposed between the first lens group and the second lens group.

16. The imaging device according to claim 15, wherein the diaphragm is attached to the object side surface of the fourth lens.

17. The imaging device according to claim 14, wherein the first lens group includes:
a protective lens disposed at an object side of the first lens.

18. The imaging device according to claim 17, wherein both of an object side surface and an image side surface of the protective lens are flat surfaces.

19. An unmanned aerial vehicle, comprising:
an imaging device and an aircraft body,
wherein the imaging device is mounted to the aircraft body, and
wherein the imaging device comprises:
an imaging sensor; and
a wide angle lens comprising:
a first lens group and a second lens group disposed in sequence from an object side to an image side of the wide angle lens,
wherein the first lens group comprises, in sequence from an object side to an image side of the first lens group:
a first lens having a negative refractive power, wherein an object side surface of the first lens is a convex surface and an image side surface is a concave surface;
a second lens having a negative refractive power, wherein an object side surface of the second lens is a convex surface and an image side surface is a concave surface; and a third lens having a positive refractive power, wherein both of an object side surface and an image side surface of the third lens are convex surfaces;

wherein the second lens group comprises, in sequence from an object side to an image side of the second lens group:
- a fourth lens having a positive refractive power, wherein an object side surface of the fourth lens is a flat surface and an image side surface is a convex surface;
- a fifth lens having a positive refractive power, wherein both of an object side surface and an image side surface of the fifth lens are convex surfaces;
- a sixth lens having a negative refractive power, wherein both of an object side surface and an image side surface are concave surfaces; and
- a seventh lens having a positive refractive power, wherein both of an object side surface and an image side surface are convex surfaces, wherein the wide angle lens satisfies the following relationship:

$H2/G2R2 < 1.8$, wherein $H2$ is a diameter of the image side surface of the first lens, and $G2R2$ is a curvature radius of the image side surface of the first lens, and wherein the imaging sensor is provided at the image side of the wide angle lens.

20. The unmanned aerial vehicle of claim 19, further comprising:
a gimbal mounted to the aircraft body, wherein the imaging device is mounted to the gimbal.

* * * * *